US012208040B2

(12) United States Patent
Masuda et al.

(10) Patent No.: US 12,208,040 B2
(45) Date of Patent: Jan. 28, 2025

(54) BOARDING AND ALIGHTING SUPPORT METHOD

(71) Applicant: TOYOTA JIDOSHA KABUSHIKI KAISHA, Toyota (JP)

(72) Inventors: Taizo Masuda, Yokohama (JP); Ryota Tomizawa, Mishima (JP); Sei Miyazaki, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 17/974,623

(22) Filed: Oct. 27, 2022

(65) Prior Publication Data

US 2023/0218456 A1 Jul. 13, 2023

(30) Foreign Application Priority Data

Jan. 12, 2022 (JP) .................................. 2022-002829

(51) Int. Cl.
*A61G 3/02* (2006.01)
*G09B 21/00* (2006.01)

(52) U.S. Cl.
CPC .............. *A61G 3/02* (2013.01); *G09B 21/00* (2013.01)

(58) Field of Classification Search
CPC .................................. A61G 3/02; G09B 21/00
USPC ........................................................... 348/62
See application file for complete search history.

(56) References Cited

U.S. PATENT DOCUMENTS

| 11,618,320 B1 * | 4/2023 | Austria .................. B60K 35/00 |
| | | 701/36 |
| 2017/0127215 A1 * | 5/2017 | Khan ...................... G08G 1/202 |
| 2017/0213165 A1 * | 7/2017 | Stauffer ................. G06Q 10/02 |
| 2020/0410408 A1 * | 12/2020 | Shitara .................. G06Q 50/40 |
| 2021/0304412 A1 | 9/2021 | Azuma |
| 2024/0257355 A1 * | 8/2024 | Azuma ................. B61L 23/041 |

FOREIGN PATENT DOCUMENTS

| JP | 2008-065759 A | 3/2008 |
| JP | 2019-121049 A | 7/2019 |
| JP | 2021-060772 A | 4/2021 |
| WO | 2020/045556 A1 | 9/2021 |

\* cited by examiner

*Primary Examiner* — Jamie J Atala
*Assistant Examiner* — Mahmoud Kamal Abouzahra
(74) *Attorney, Agent, or Firm* — Dinsmore & Shohl LLP

(57) ABSTRACT

A boarding and alighting support method supports a person requiring support who requires support of another person to get on a vehicle or get off a vehicle. The boarding and alighting support method includes: a storing step of storing at least one of a first image that is an image of the person requiring support and a second image that is an image of a protector of the person requiring support; a first display step in which the vehicle that the person requiring support is planned to get on displays the at least one of the first image and the second image; and a second display step in which the vehicle displays the at least one of the first image and the second image when the person requiring support is planned to get off the vehicle.

3 Claims, 3 Drawing Sheets

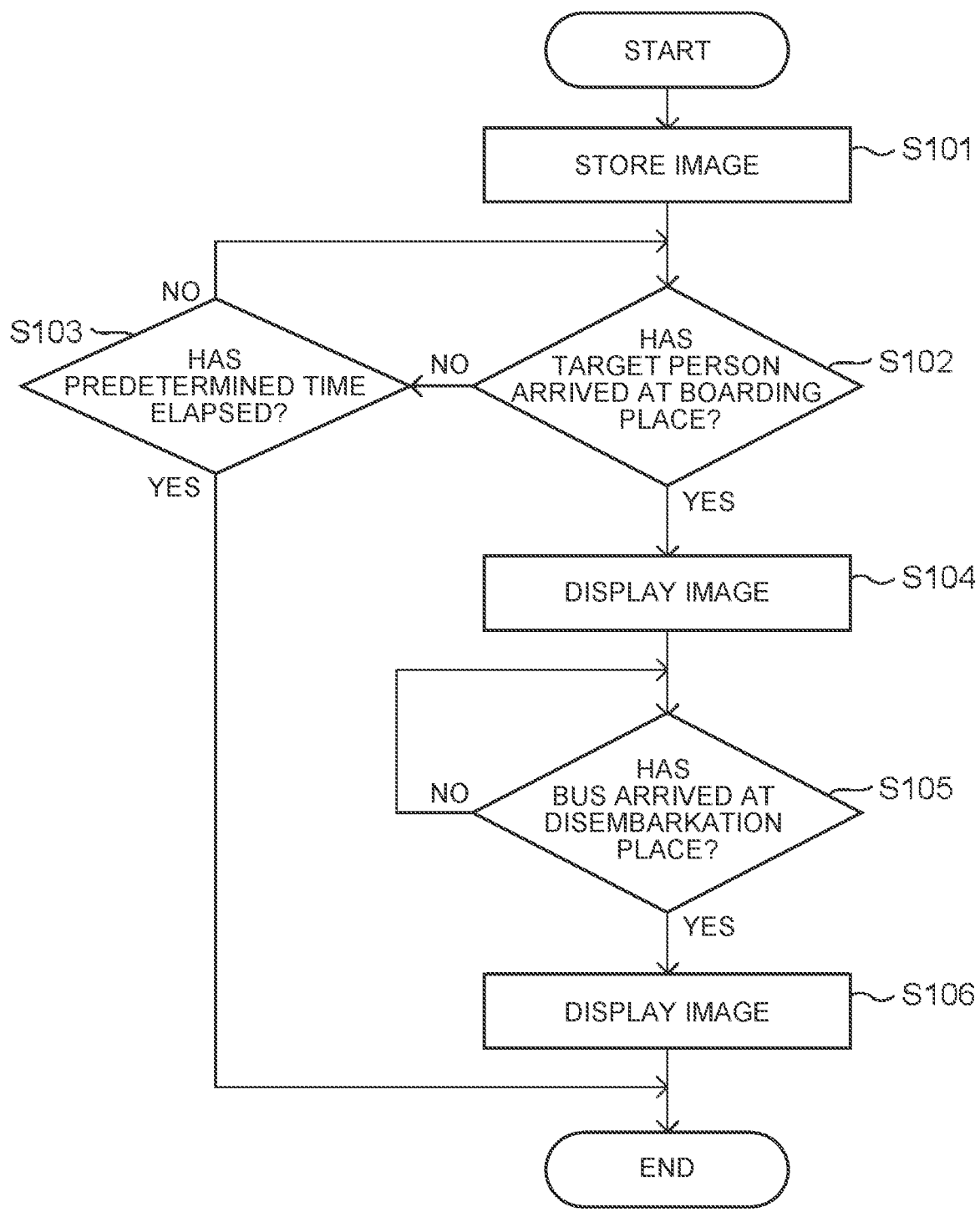

FIG. 3A
FIG. 3B
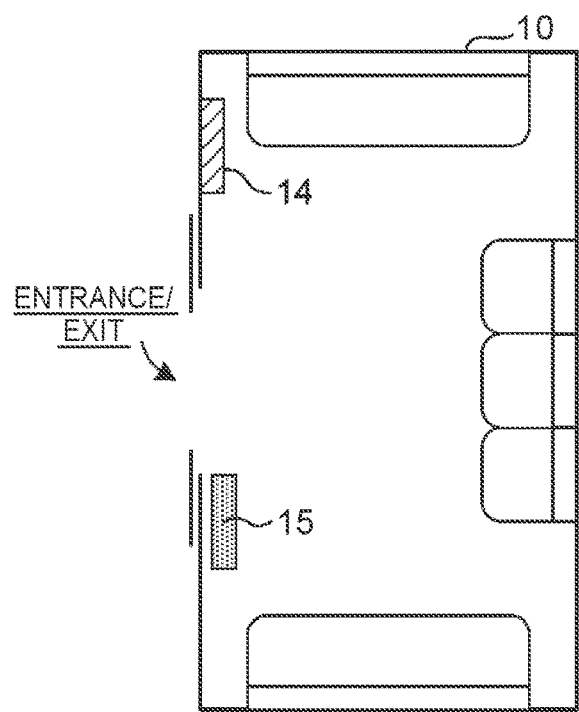
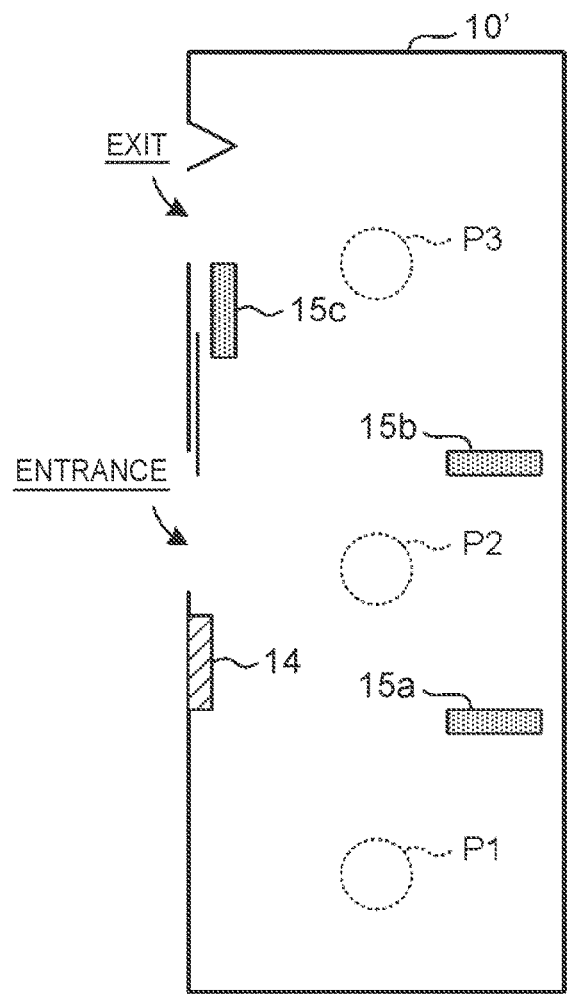

BOARDING AND ALIGHTING SUPPORT METHOD

CROSS-REFERENCE TO RELATED APPLICATION

This application claims priority to Japanese Patent Application No. 2022-002829 filed on Janu. 12, 2022, incorporated herein by reference in its entirety.

BACKGROUND

1. Technical Field

The present disclosure relates to a technical field of a boarding and alighting support method.

2. Description of Related Art

Due to the circumstances of protectors (parents) and guardians, for example, persons with intellectual disabilities and patients with relatively mild dementia (i.e., protected persons and wards) may have to use public transportation independently. As a technique to support persons with intellectual disabilities or the like in such cases, for example, there is proposed an outing support system that outputs a guide voice or the like in accordance with the position of a patient with dementia based on an outing schedule that takes into consideration the round-trip travel route, the time and transfer of public transportation that is used, the time spent at the destination, the scheduled return time, and the like (see Japanese Unexamined Patent Application Publication No. 2021-060772 (JP 2021-060772 A)).

SUMMARY

For example, at a relatively large bus stop, multiple buses may stop at the same time. In this case, persons with intellectual disabilities or the like may not be able to identify the bus they should get on. In addition, the name of the bus stop where persons with intellectual disabilities or the like should get off may be confused with the name of another bus stop on the same route (for example, "ABC 1-Chome", "ABC 3-Chome", etc.). In this case, the persons with intellectual disabilities or the like may not be able to get off at the bus stop where they should get off In the technique described in JP 2021-060772 A, a guide voice is output, but there is a possibility that the content of the guide voice cannot be correctly understood depending on the language ability of persons with intellectual disabilities or the like.

The present disclosure has been made in view of the above circumstances, and an object of the present disclosure is to provide a boarding and alighting support method capable of supporting boarding and alighting of persons with intellectual disabilities or the like.

A boarding and alighting support method according to an aspect of the present disclosure is a boarding and alighting support method for supporting a person requiring support who requires support of another person to get on a vehicle or get off a vehicle, and includes: a storing step of storing at least one of a first image that is an image of the person requiring support and a second image that is an image of a protector of the person requiring support; a first display step in which the vehicle that the person requiring support is planned to get on displays the at least one of the first image and the second image; and a second display step in which the vehicle displays the at least one of the first image and the second image when the person requiring support is planned to get off the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart showing an operation of the support system according to the embodiment;

FIG. 3A is an example of a plan view of a bus; and

FIG. 3B is an example of a plan view of a bus.

DETAILED DESCRIPTION OF EMBODIMENTS

Figure 1:
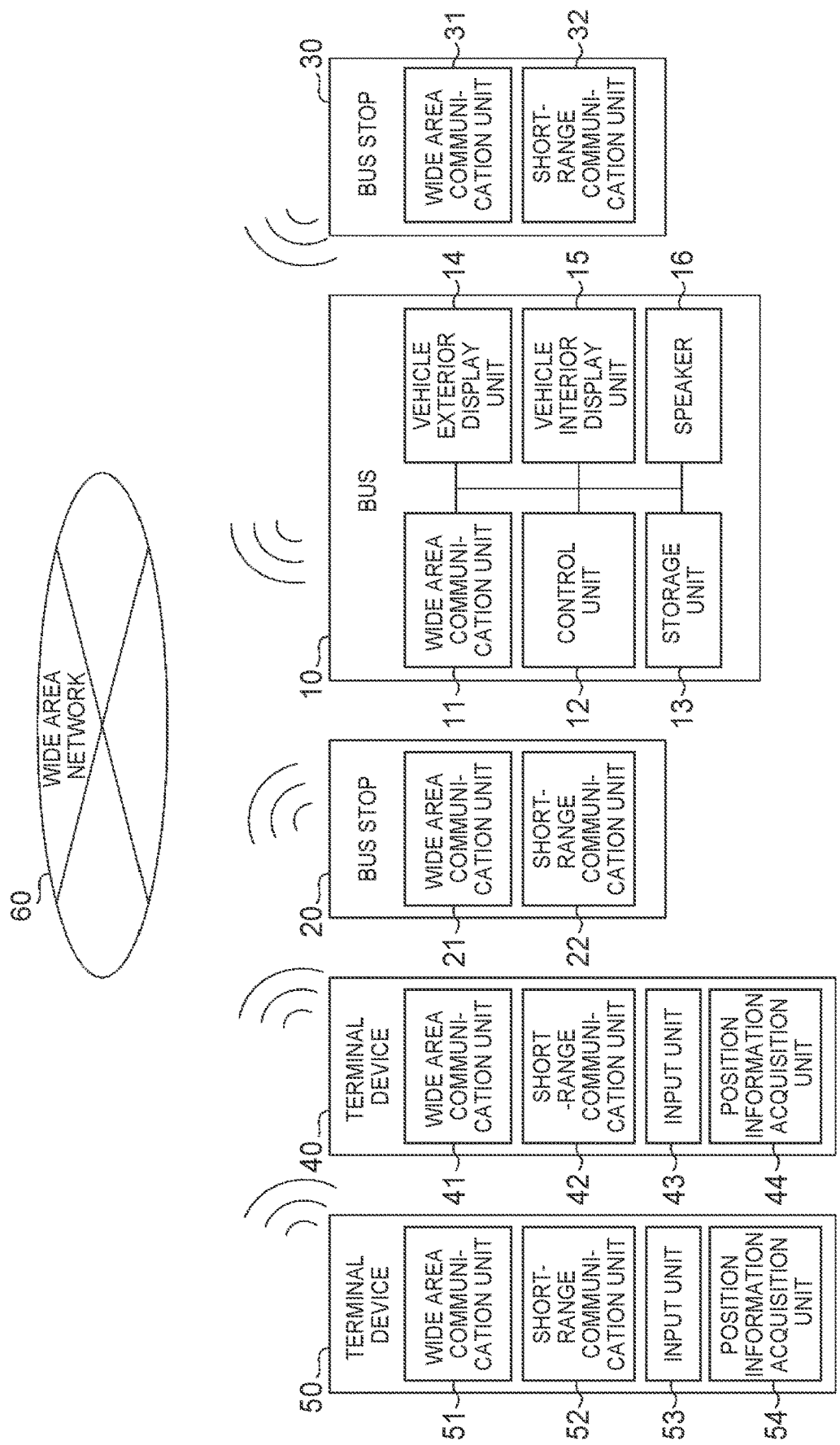
FIG. 1 is a block diagram showing a configuration of a support system according to an embodiment.

An embodiment related to a boarding and alighting support method will be described with reference to FIGS. 1 to 3B. Here, a fixed-route bus is taken as an example of public transportation. The target persons of the boarding and alighting support method are persons who need the support of others to use public transportation, such as, for example, persons with intellectual disabilities, patients with (relatively mild) dementia, and children. The target person of the boarding and alighting support method is appropriately referred to as a "person requiring support". The "child" may be, for example, a person of an age to which a child fare, an infant fare, etc. are applied.

In the embodiment described below, it is assumed that the person requiring support is accompanied by an attendant such as a protector or a guardian up to the bus stop where the person requiring support gets on the bus. In addition, it is assumed that a person who picks up the person requiring support (for example, a protector, a guardian, etc.) is waiting at the bus stop where the person requiring support gets off the bus.

A support system 1 to which the boarding and alighting support method according to the embodiment is applied will be described with reference to FIG. 1. In FIG. 1, the support system 1 includes a bus 10, bus stops 20, 30, and terminal devices 40, 50. The bus 10, the bus stops 20, 30, and the terminal devices 40, 50 can communicate with each other via a wide area network 60 such as the Internet. It should be noted that a server that mediates communication between the bus 10, the bus stops 20, 30, and the terminal devices 40, 50 may be provided.

The bus 10 may be an autonomous driving vehicle that does not require a driver's operation (or does not require a driver), or may be a vehicle that is steered by the driver. The bus 10 includes a wide area communication unit 11, a control unit 12, a storage unit 13, a vehicle exterior display unit 14, a vehicle interior display unit 15, and a speaker 16.

The wide area communication unit 11 communicates via the wide area network 60 (the same applies to wide area communication units 21, 31, 41, and 51 described later). The vehicle exterior display unit 14 is a display unit that allows the display contents to be visually recognized from the outside of the bus 10. That is, the screen of the vehicle exterior display unit 14 faces the outside of the bus 10. The vehicle interior display unit 15 is a display unit on which the occupants inside the bus 10 can visually recognize the display contents. That is, the screen of the vehicle interior display unit 15 faces the interior of the bus 10.

The control unit 12 controls the wide area communication unit 11, the vehicle exterior display unit 14, the vehicle interior display unit 15, and the speaker 16. The storage unit 13 may store, for example, information received via the wide area communication unit 11 and information used for control by the control unit 12 (for example, a computer program or the like). The operation of the control unit 12 will be described later.

In the present embodiment, it is assumed that the bus stop 20 is a bus stop where the person requiring support gets on the bus 10, and the bus stop 30 is a bus stop where the person requiring support gets off the bus 10. The bus stop 20 includes the wide area communication unit 21 and a short-range communication unit 22. Similarly, the bus stop 30 includes the wide area communication unit 31 and a short-range communication unit 32.

In the present embodiment, it is assumed that the terminal device 40 is a terminal device carried by the person requiring support, and the terminal device 50 is a terminal device carried by the protector of the person requiring support. For example, smartphones, tablet terminals and the like can be applied to the terminal devices 40, 50. It is assumed that the application for using the support system 1 is installed in the terminal devices 40, 50.

The terminal device 40 includes the wide area communication unit 41, a short-range communication unit 42, an input unit 43, and a position information acquisition unit 44. Similarly, the terminal device 50 includes the wide area communication unit 51, a short-range communication unit 52, an input unit 53, and a position information acquisition unit 54. For example, a touch panel, a keyboard, or the like can be applied to the input units 43, 53. The position information acquisition units 44, 54 acquire position information related to the terminal devices 40, 50 by using, for example, a global navigation satellite system (GNSS) or the like.

The short-range communication units 22, 32, 42, and 52 are communication units compliant with communication standards such as infrared communication, Bluetooth (registered trademark), Wi-Fi (registered trademark), and near-field communication (NFC). Various existing modes can be applied to the wide area communication units 11, 21, 31, 41, and 51, the vehicle exterior display unit 14, the vehicle interior display unit 15, the speaker 16, and the short-range communication units 22, 32, 42, and 52, and therefore the details thereof will be omitted.

Next, the movement of the person requiring support in the support system 1 will be described. The protector of the person requiring support operates the input unit 53 or the input unit 43 of the terminal device 50 (that is, the terminal device carried by the protector) or the terminal device 40 (that is, the terminal device carried by the person requiring support), to enter, for example, the bus stop where the person requiring support gets on (here, the bus stop 20), the bus that the person requiring support gets on (here, the bus 10), and the bus stop where the person requiring support gets off (here, the bus stop 30).

It should be noted that the input of the bus that the person requiring support gets on may be performed by inputting or selecting the departure time of the bus at the bus stop where the person requiring support gets on. The bus stop where the person requiring support gets on, the bus that the person requiring support gets on, and the bus stop where the person requiring support gets off, which are input above, are hereinafter appropriately referred to as "transportation use information".

The protector operates the terminal device 50 or the terminal device 40 to instruct the transmission of the transportation use information and at least one of a first image that is an image of the person requiring support and a second image which is an image of the protector. The transportation use information and the at least one of the first image and the second image are transmitted to the bus 10 via the wide area communication unit 51 or the wide area communication unit 41 and the wide area network 60. The bus 10 stores the transportation use information and the at least one of the first image and the second image in the storage unit 13.

When the protector operates the terminal device 50 to input the transportation use information, the input transportation use information may also be transmitted to the terminal device 40 carried by the person requiring support. When the support system 1 includes, for example, a server that receives the transportation use information from each of the plurality of terminal devices including the terminal devices 40, 50 and distributes the transportation use information to the plurality of buses including the bus 10, the transportation use information input by the protector through the operation of the terminal device 50 may be shared with the terminal device 40 via the server. Sharing of the transportation use information may be performed, for example, by associating the transportation use information with user identification information.

Subsequently, for example, accompanied by the protector, the person requiring support heads for the bus stop 20 where the person requiring support will get on the bus 10. At this time, the position information acquisition unit 44 of the terminal device 40 acquires the position information indicating the current position of the terminal device 40. Similarly, the position information acquisition unit 54 of the terminal device 50 acquires the position information indicating the current position of the terminal device 50.

Based on the position information acquired by the position information acquisition unit 44, the terminal device 40 communicates with the bus stop 20 via the short-range communication unit 42 when the position of the terminal device 40 falls within a range that allows short-range communication with the bus stop 20. The bus stop 20 notifies the bus 10 via the wide area communication unit 21 and the wide area network 60 that the person requiring support has arrived at the bus stop 20, provided that the short-range communication unit 22 has communicated with the terminal device 40.

Upon receiving the notification that the person requiring support has arrived at the bus stop 20, the control unit 12 of the bus 10 causes the vehicle exterior display unit 14 to display at least one of the first image and the second image stored in the storage unit 13 when the bus 10 arrives at the bus stop 20 (or at a predetermined time prior to the arrival of the bus 10 at the bus stop 20). For example, the person requiring support uses at least one of the first image (that is, the image of himself/herself) and the second image (that is, the image of the protector) displayed on the vehicle exterior display unit 14 of the bus 10 as a guide to get on the bus 10.

The control unit 12 of the bus 10 specifies the bus stop where the person requiring support gets off (here, the bus stop 30), based on the transportation use information stored in the storage unit 13. When the bus 10 arrives at the bus stop 30 (or at a predetermined time prior to the arrival of the bus 10 at the bus stop 30), the control unit 12 causes the vehicle interior display unit 15 to display at least one of the first image and the second image stored in the storage unit 13. At this time, the control unit 12 may output a voice from the speaker 16 to prompt the person requiring support to get off.

For example, when the transportation use information includes the name of the person requiring support, the control unit 12 may prompt the person requiring support to get off by outputting a voice reading the name of the person requiring support from the speaker 16.

In the present embodiment, a person who picks up the person requiring support is waiting at the bus stop 30. When the bus 10 arrives at the bus stop 30, the control unit 12 of the bus 10 may cause the vehicle exterior display unit 14 to display at least one of the first image and the second image. With this configuration, the person who picks up the person requiring support can relatively easily specify the bus that the person requiring support is on.

Based on the position information acquired by the position information acquisition unit 44, the terminal device 40 may communicate with the bus stop 30 via the short-range communication unit 42 when the position of the terminal device 40 falls within a range that allows short-range communication with the bus stop 30 (that is, when the bus 10 arrives at the bus stop 30). The bus stop 30 may notify, via the wide area communication unit 31 and the wide area network 60, the terminal device 50 carried by the protector that the person requiring support has arrived at the bus stop 30, provided that the short-range communication unit 32 has communicated with the terminal device 40.

Next, the operation of the control unit 12 of the bus 10 in the support system 1 will be described with reference to the flowchart of FIG. 2. In FIG. 2, the control unit 12 stores the transportation use information transmitted from the terminal device 40 or the terminal device 50 and the at least one of the first image and the second image in the storage unit 13 (step S101). Subsequently, the control unit 12 determines whether a support target person (that is, the person requiring support) has arrived at the boarding place (for example, the bus stop 20) (step S102).

When it is determined in the process of step S102 that the support target person has not arrived at the boarding place (step S102: No), the control unit 12 determines whether the predetermined time has elapsed (step S103). The "predetermined time" may be, for example, the estimated time of arrival when the bus 10 arrives at the boarding place of the support target person.

When it is determined in the process of step S103 that the predetermined time has elapsed (step S103: Yes), the operation shown in FIG. 2 is terminated. When it is determined in the process of step S103 that the predetermined time has not elapsed (step S103: No), the process of step S102 is performed again.

When it is determined in the process of step S102 that the support target person has arrived at the boarding place (step S102: Yes), the control unit 12 causes the vehicle exterior display unit 14 to display at least one of the first image and the second image, for example, when the bus 10 arrives at the boarding place (step S104).

Next, the control unit 12 determines whether the bus 10 has arrived at the disembarkation place (for example, the bus stop 30) of the support target person (step S105). When it is determined in the process of step S105 that the bus 10 has not arrived at the disembarkation place of the support target person (step S105: No), the process of step S105 is performed again. That is, the process is in a standby state until the bus 10 arrives at the disembarkation place of the support target person.

When it is determined in the process of step S105 that the bus 10 has arrived at the disembarkation place of the support target person (step S105: Yes), the control unit 12 causes the vehicle interior display unit 15 to display at least one of the first image and the second image (step S106). At this time, the control unit 12 may output a voice from the speaker 16 to prompt the support target person to get off.

For example, when the bus 10 is a bus having only one entrance/exit as shown in FIG. 3A, the vehicle interior display unit 15 may be disposed near the entrance/exit of the bus 10 as shown in FIG. 3A. For example, when the bus 10 is a bus in which an entrance and an exit are separately provided as shown in FIG. 3B, the bus 10 may include a plurality of displays 15a, 15b, and 15c as the vehicle interior display unit 15.

In this case, the control unit 12 may cause the display 15a to display at least one of the first image and the second image when the support target person is present at the position P1. The control unit 12 may cause the display 15b to display at least one of the first image and the second image when the support target person is present at the position P2. The control unit 12 may cause the display 15c to display at least one of the first image and the second image when the support target person is present at the position P3. With this configuration, the support target person (that is, the person requiring support) can be guided to the exit of the bus 10.

The position of the support target person in the inside of the bus 10 may be specified from, for example, an image of a camera that captures an image of the inside of the bus 10. A seat on which the support target person sits may be prepared in the bus 10. With this configuration, the actual appearance of the support target person can be recognized from the image of the camera, so that the position of the support target person in the inside of the bus 10 can be relatively easily specified from the image of the camera. In this case, after the support target person seated in the prepared seat wears the seat belt, the control unit 12 may lock the seat belt so that the seat belt is not released until the bus 10 arrives at the disembarkation place of the support target person.

Further, the control unit 12 of the bus 10 may communicate with the terminal device 40 carried by the support target person to cause the terminal device 40 to emit a voice prompting the support target person to get off when the bus 10 arrives at the bus stop where the support target person gets off. Similarly, when the bus 10 stops at a bus stop different from the bus stop where the support target person should get off, the control unit 12 may cause the terminal device 40 to emit a voice notifying that the bus stop is not the disembarkation place, for example.

Technical Effect

Persons with intellectual disabilities and patients with dementia may, for example, get on a vehicle different from the vehicle they planned to get on or forget their destination. In addition, it is often difficult for persons with intellectual disabilities and patients with dementia to convey that they are in trouble to people they meet for the first time. The same things can happen to children.

In the support system 1, when the bus 10 arrives at the bus stop 20 where the person requiring support such as a person with intellectual disabilities gets on, at least one of the first image (that is, an image of the person requiring support) and the second image (that is, an image of the protector) is displayed on the vehicle exterior display unit 14 of the bus 10. It can be expected that the person requiring support will feel familiar and secure with the image of the person requiring support himself/herself and the image of the protector. Therefore, by displaying at least one of the first image and the second image on the vehicle exterior display unit 14, the person requiring support can be guided to the bus 10 that he/she should get on. In the support system 1, when the bus 10 that the person requiring support is on arrives at the bus stop 30 where the person requiring support gets off, at least one of the first image and the second image is displayed on the vehicle interior display unit 15 of the bus 10. This makes it possible for the person requiring support to be aware of the bus stop where he/she should get off.

Therefore, according to the support system 1, it is possible to support the boarding and alighting of a person requiring support such as person with intellectual disabilities. In addition, since the person requiring support can use public transportation such as the bus 10 independently, the burden of attendance by a protector or the like can be reduced. The support system 1 can be applied not only to a fixed-route bus but also to other public transportation such as railways.

Various modes of the disclosure derived from the embodiment described above will be described below.

A boarding and alighting support method according to an aspect of the disclosure is a boarding and alighting support method for supporting a person requiring support who requires support of another person to get on a vehicle or get off a vehicle, and includes: a storing step of storing at least one of a first image that is an image of the person requiring support and a second image that is an image of a protector of the person requiring support; a first display step in which the vehicle that the person requiring support is planned to get on displays the at least one of the first image and the second image; and a second display step in which the vehicle displays the at least one of the first image and the second image when the person requiring support is planned to get off the vehicle. In the above-described embodiment, the "bus 10" corresponds to an example of a "vehicle".

Here, the person requiring support may include at least one of a child, a patient with dementia, and a person with intellectual disabilities.

In the boarding and alighting support method, the vehicle may include a first display device that is visually recognizable from an outside of the vehicle and a second display device that is visually recognizable by an occupant inside the vehicle, the vehicle may display the at least one of the first image and the second image on the first display device in the first display step, and the vehicle may display the at least one of the first image and the second image on the second display device in the second display step. In the above-described embodiment, the "vehicle exterior display unit 14" corresponds to an example of the "first display device", and the "vehicle interior display unit 15" and the "displays 15a, 15b, and 15c" correspond to an example of the "second display device".

In this mode, the vehicle may include a plurality of displays as the second display device, and the vehicle may determine, among the displays, a display that displays the at least one of the first image and the second image to guide the person requiring support to an exit of the vehicle in the second display step.

The present disclosure is not limited to the above-described embodiment, and can be appropriately modified within the scope of claims and within the scope not contrary to the gist or idea of the disclosure that can be read from the entire specification, and a boarding and alighting support method including such modifications is also included in the technical scope of the present disclosure.

What is claimed is:

1. A boarding and alighting support method for supporting a person requiring support who requires support of another person to get on a vehicle or get off a vehicle, the boarding and alighting support method comprising:
    a storing step of storing at least one of a first image that is an image of the person requiring support and a second image that is an image of a protector of the person requiring support;
    a first display step in which the vehicle that the person requiring support is planned to get on displays the at least one of the first image and the second image; and
    a second display step in which the vehicle displays the at least one of the first image and the second image when the person requiring support is planned to get off the vehicle, wherein:
    the vehicle includes a first display device that is visually recognizable from an outside of the vehicle and a plurality of second display devices that are visually recognizable by an occupant inside the vehicle;
    the vehicle displays the at least one of the first image and the second image on the first display device in the first display step; and
    the vehicle determines, among the plurality of second display devices, a second display device that displays the at least one of the first image and the second image to guide the person requiring support to an exit of the vehicle in the second display step.

2. The boarding and alighting support method according to claim 1, wherein the person requiring support includes at least one of a child, a patient with dementia, and a person with intellectual disabilities.

3. The boarding and alighting support method according to claim 1 further comprising determining a position of the person requiring support within the vehicle, wherein:
    upon determining that the person requiring support is present at a first position, displaying the at least one of the first image and the second image on a primary display device, from among the plurality of second display devices, that is visually recognizable from the first position;
    upon determining that the person requiring support is present at a second position closer to an exit of the vehicle than the first position, displaying the at least one of the first image and the second image on a secondary display device, from among the plurality of second display devices, that is visually recognizable from the second position, the secondary display device is closer to the exit of the vehicle than the primary display device; and
    upon determining that the person requiring support is present at a third position closer to the exit of the vehicle than the first position and the second position, displaying the at least one of the first image and the second image on a tertiary display device, from among the plurality of second display devices, that is visually recognizable from the third position, the tertiary display device is closer to the exit of the vehicle than the primary display device and the secondary display device.

* * * * *